United States Patent
Horn

(10) Patent No.: US 9,430,376 B2
(45) Date of Patent: Aug. 30, 2016

(54) PRIORITY-BASED GARBAGE COLLECTION FOR DATA STORAGE SYSTEMS

(71) Applicant: Western Digital Technologies, Inc., Irvine, CA (US)

(72) Inventor: Robert L. Horn, Yorba Linda, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 232 days.

(21) Appl. No.: 13/727,278

(22) Filed: Dec. 26, 2012

(65) Prior Publication Data

US 2014/0181432 A1    Jun. 26, 2014

(51) Int. Cl.
*G06F 12/02* (2006.01)
*G06F 3/06* (2006.01)

(52) U.S. Cl.
CPC ........ *G06F 12/0253* (2013.01); *G06F 12/0246* (2013.01); *G06F 3/064* (2013.01); *G06F 12/02* (2013.01); *G06F 2212/72* (2013.01); *G06F 2212/7205* (2013.01); *G06F 2212/7211* (2013.01)

(58) Field of Classification Search
CPC . G02F 12/02; G02F 12/0253; G02F 12/0276; G02F 2212/72; G02F 2212/7205; G02F 2212/7211; G02F 3/064
USPC .......... 711/103, 113, 159, 165, 179, E12.011, 711/E12.012, E12.006; 379/234, 246; 714/764, 805
See application file for complete search history.

(56) References Cited

U.S. PATENT DOCUMENTS

| | | | |
|---|---|---|---|
| 5,581,785 | A | 12/1996 | Nakamura et al. |
| 5,586,291 | A | 12/1996 | Lasker et al. |
| 6,044,439 | A | 3/2000 | Ballard et al. |
| 6,662,267 | B2 | 12/2003 | Stewart |
| 6,807,630 | B2 | 10/2004 | Lay et al. |
| 6,968,450 | B1 | 11/2005 | Rothberg et al. |
| 7,017,037 | B2 | 3/2006 | Fortin et al. |
| 7,028,174 | B1 | 4/2006 | Atai-Azimi et al. |
| 7,082,494 | B1 | 7/2006 | Thelin et al. |
| 7,107,444 | B2 | 9/2006 | Fortin et al. |
| 7,120,806 | B1 | 10/2006 | Codilian et al. |
| 7,334,082 | B2 | 2/2008 | Grover et al. |

(Continued)

FOREIGN PATENT DOCUMENTS

KR    1020090050382    5/2009

OTHER PUBLICATIONS

Jang et al, "Efficient Garbage Collection Policy and Block Management Method for NAND Flash Memory", IEEE—Mechanical and Electronics Engineering (ICMEE), 2010 2nd International Conference (vol. 1), Aug. 1-3, 2010, pp. V1-327-V1-331.*

(Continued)

*Primary Examiner* — David X Yi
*Assistant Examiner* — Kamal Dewan

(57) ABSTRACT

Priority-based garbage collection utilizes attributes of data stored in the non-volatile memory array in order to improve efficiency of garbage collection and of the overall data storage system. A set of low priority data can be selectively evicted from a non-volatile memory array. This can, for example, reduce write amplification associated with garbage collection. Another set of low priority data can be regrouped or consolidated in a different region of the non-volatile memory array. In addition, flushing of data can be performed in order to enhance or optimize garbage collection. Performance and endurance can thereby be improved.

23 Claims, 5 Drawing Sheets

(56) References Cited

U.S. PATENT DOCUMENTS

| | | |
|---|---|---|
| 7,395,452 B2 | 7/2008 | Nicholson et al. |
| 7,411,757 B2 | 8/2008 | Chu et al. |
| 7,472,222 B2 | 12/2008 | Auerbach et al. |
| 7,509,471 B2 | 3/2009 | Gorobets |
| 7,516,346 B2 | 4/2009 | Pinheiro et al. |
| 7,610,438 B2 | 10/2009 | Lee et al. |
| 7,613,876 B2 | 11/2009 | Bruce et al. |
| 7,644,231 B2 | 1/2010 | Recio et al. |
| 8,341,339 B1 | 12/2012 | Boyle et al. |
| 8,677,203 B1* | 3/2014 | Shalvi et al. ............... 714/747 |
| 2007/0033330 A1* | 2/2007 | Sinclair et al. ............. 711/103 |
| 2007/0186032 A1 | 8/2007 | Sinclair et al. |
| 2008/0059694 A1 | 3/2008 | Lee |
| 2008/0109590 A1* | 5/2008 | Jung .................. G06F 12/0246 711/103 |
| 2008/0130156 A1 | 6/2008 | Chu et al. |
| 2008/0177938 A1 | 7/2008 | Yu |
| 2008/0222353 A1 | 9/2008 | Nam et al. |
| 2008/0256287 A1 | 10/2008 | Lee et al. |
| 2009/0019218 A1 | 1/2009 | Sinclair et al. |
| 2009/0031076 A1* | 1/2009 | In ......................... G06F 3/0616 711/103 |
| 2009/0150599 A1 | 6/2009 | Bennett |
| 2009/0193182 A1 | 7/2009 | Nitta |
| 2009/0271562 A1 | 10/2009 | Sinclair |
| 2010/0172180 A1* | 7/2010 | Paley ................. G06F 12/0246 365/185.12 |
| 2011/0022778 A1 | 1/2011 | Schibilla |
| 2011/0055455 A1* | 3/2011 | Post et al. .................... 711/103 |
| 2011/0113075 A1 | 5/2011 | Fukushima |
| 2011/0213945 A1* | 9/2011 | Post ..................... G06F 3/0644 711/173 |
| 2011/0225346 A1 | 9/2011 | Goss et al. |
| 2011/0258391 A1 | 10/2011 | Atkisson et al. |
| 2012/0059978 A1* | 3/2012 | Rosenband et al. .......... 711/103 |
| 2012/0066438 A1 | 3/2012 | Yoon et al. |
| 2012/0066473 A1 | 3/2012 | Tremaine et al. |
| 2012/0096217 A1* | 4/2012 | Son et al. ..................... 711/103 |
| 2012/0191936 A1* | 7/2012 | Ebsen ................. G06F 12/0253 711/170 |
| 2012/0198174 A1 | 8/2012 | Nellans et al. |
| 2012/0215972 A1* | 8/2012 | Asnaashari et al. .......... 711/103 |
| 2012/0297122 A1* | 11/2012 | Gorobets et al. ............. 711/103 |

OTHER PUBLICATIONS

International Search Report and Written Opinion dated Jan. 6, 2014, from PCT/US2013/061473 to Western Digital Technologies, Inc., filed Sep. 24, 2013, 13 pages.

"Hybrid Information Feature", Serial ATA International Organization, Proposed Draft, Version 8, Apr. 19, 2012, 79 pages.

Extended European Search Report dated May 24, 2016 from related European Patent Application No. EP 13867022.9, 9 pages.

\* cited by examiner

PRIORITY-BASED GARBAGE COLLECTION FOR DATA STORAGE SYSTEMS

BACKGROUND

1. Technical Field

This disclosure relates to data storage systems for computer systems. More particularly, the disclosure relates to priority-based garbage collection for data storage systems.

2. Description of the Related Art

Data storage systems execute many housekeeping operations in the course of their normal operation. For example, garbage collection is frequently performed on memory regions that may contain both valid and invalid data. When a region is selected for garbage collection, the garbage collection operation copies valid data within the memory region to new location(s) in memory and then erases or frees the entire region, thereby making the region available for future storage of data. However, performing garbage collection involves substantial overhead, such as increased write amplification in cases when solid state memory is used for storing data. Accordingly, it is desirable to provide more efficient garbage collection mechanisms.

BRIEF DESCRIPTION OF THE DRAWINGS

Systems and methods that embody the various features of the invention will now be described with reference to the following drawings, in which.

DETAILED DESCRIPTION

Figure 1:
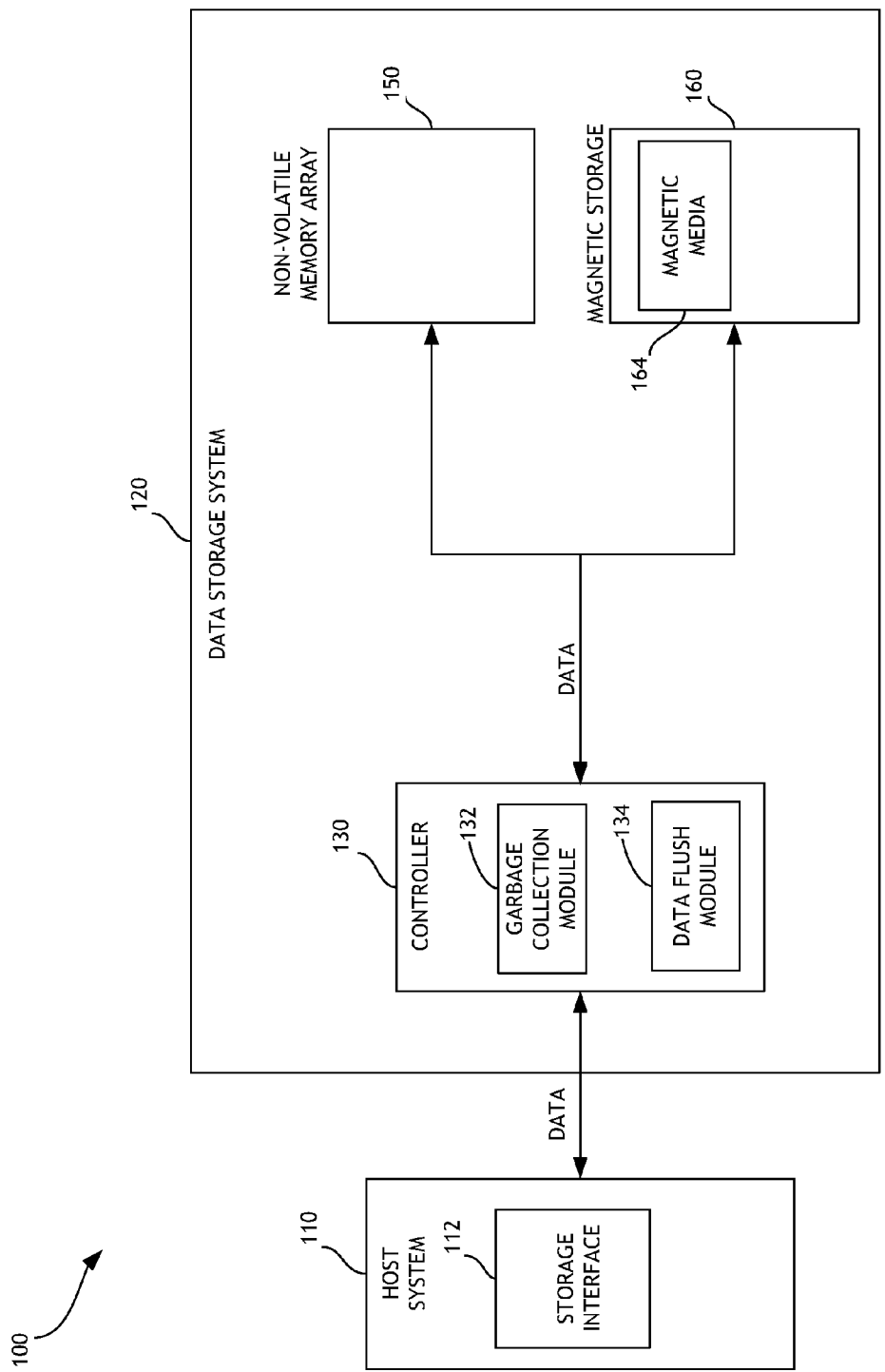
FIG. 1 illustrates a combination of a host system and a data storage system that implements priority-based garbage collection according to one embodiment of the invention.

While certain embodiments are described, these embodiments are presented by way of example only, and are not intended to limit the scope of protection. Indeed, the novel methods and systems described herein may be embodied in a variety of other forms. Furthermore, various omissions, substitutions, and changes in the form of the methods and systems described herein may be made without departing from the scope of protection.

Overview

Data storage systems such as flash storage devices perform internal system operations, such as garbage collection, wear leveling, bad block management, and the like to improve performance and longevity. Garbage collection can involve copying valid data stored in a memory region to another memory region, and further indicating that the former memory region no longer stores any valid data. For prioritizing, garbage collection can utilize the amount of invalid data remaining in the memory regions to be garbage collected. However, garbage collection operation involves considerable overhead, and prioritizing garbage collection based solely on the amount of invalid data may introduce undesirable inefficiencies. For example, stored data may be associated with varying levels of priority, and it can be advantageous to take priority of data into account when performing garbage collection.

Embodiments of the present invention are directed to garbage collection that takes into account priority of stored data when performing garbage collection. In one embodiment, a non-volatile solid-state memory (NVSM) serves as a cache in a hybrid disk drive that pairs the NVSM with rotating magnetic media. During garbage collection of a memory region in the NVSM, priority information can be used to make decisions whether, for example, to move data, evict data from cache, consolidate data in the cache, and the like. For example, high priority data can be moved to a different memory region for retaining valid data collected during garbage collection, while low priority data can be evicted from the cache. Data within a certain priority range that is just slightly higher than that of data subject to eviction can be consolidated in yet another memory region. Because such data is likely to be subject to eviction at a later time and become invalid data from the garbage collection's perspective, performing such consolidation of likely-to-be-invalidated data while garbage collecting can reduce the overhead and improve efficiency associated with future garbage collection operations. In addition, priority information can be used to make decisions about flushing data from the cache to another storage medium, such as magnetic disk. For example, non-redundant low priority data stored in the cache can be periodically flushed to the other storage medium. This can ensure that such data, which may be a candidate for eviction from the cache at a later time, is synchronized.

In some embodiments, priority information can be a combination of one or more of the following: priority provided by a host system (e.g., as part of write data command), frequency of access of data, duration since last access of data, frequency of reading versus writing data (e.g., read to write ratio), relative importance of data within a priority level, whether data has been synchronized with other storage, and the like. For example, frequently accessed data may be assigned higher priority, as keeping frequently accessed data in the cache could improve performance of a data storage system. As another example, data that has been accessed more recently than other data may be assigned higher priority, as such more recently accessed data could likely be accessed again in the future. As yet another example, data that is more frequently read than written may be assigned higher priority, as keeping such frequently read data in the cache could improve performance while reducing NVSM wear. In some embodiments, priority may be assigned based on a weighted combination of one or more foregoing factors.

For the sake of simplicity and illustration, the description below will be focused on example embodiments where the non-volatile memory array 150 serves as cache memory to the magnetic storage 160. The scope of the disclosure, however, is not limited to such embodiments. For example, in other embodiments, in lieu of magnetic storage 160, the data storage system 120 may include another type of data storage, such as a second non-volatile memory array. For example, the non-volatile memory array 150 may comprise a type of memory that offers faster write/read performance than the type of memory used in the second non-volatile memory array. In some embodiments, the non-volatile memory array 150 may serve as a cache to a data storage in a remote location, and synchronization of data may take place over one or more network connections.

System Overview

FIG. 1 illustrates a combination 100 of a host system and a data storage system that implements priority-based garbage collection according to one embodiment of the invention. As is shown, the data storage system 120 (e.g., a hybrid disk drive) includes a controller 130 and a non-volatile memory array 150, and magnetic storage 160, which comprises magnetic media 164. The non-volatile memory array 150 may comprise non-volatile memory, such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof. The non-volatile memory array 150 can comprise one or more memory regions, such as blocks, pages, etc. Memory regions can comprise memory units. In one embodiment, the non-volatile memory array 150 can act as a cache for the magnetic storage 160. The data storage system 120 can further comprise other types of storage.

The controller 130 can be configured to receive data and/or storage access commands from a storage interface module 112 (e.g., a device driver) of a host system 110. Storage access commands communicated by the storage interface 112 can include write data and read data commands issued by the host system 110. Read and write commands can specify a logical address (e.g., logical block addresses or LBAs) used to access the data storage system 120. The controller 130 can execute the received commands in the non-volatile memory array 150.

Data storage system 120 can store data communicated by the host system 110. In other words, the data storage system 120 can act as memory storage for the host system 110. To facilitate this function, the controller 130 can implement a logical interface. The logical interface can present to the host system 110 data storage system's memory as a set of logical addresses (e.g., contiguous address) where user data can be stored. Internally, the controller 130 can map logical addresses to various physical locations or addresses in the non-volatile memory array 150, magnetic storage 160, and/or other storage modules. Physical locations can be configured to store data. The controller 130 includes a garbage collection module 132 configured to perform garbage collection of the non-volatile memory array 150 and a data flush module 134 configured to synchronize data stored (e.g., cached) in the non-volatile memory array 150 with the magnetic storage 160 and/or other storage modules. In one embodiment, the garbage collection module 132 is configured to perform priority-based garbage collection, including the task of selecting memory units (e.g., blocks) on which garbage collection is to be performed. In one embodiment, the data flush module 134 is configured to perform priority-based flushing of data.

Priority-Based Garbage Collection

Figure 2:
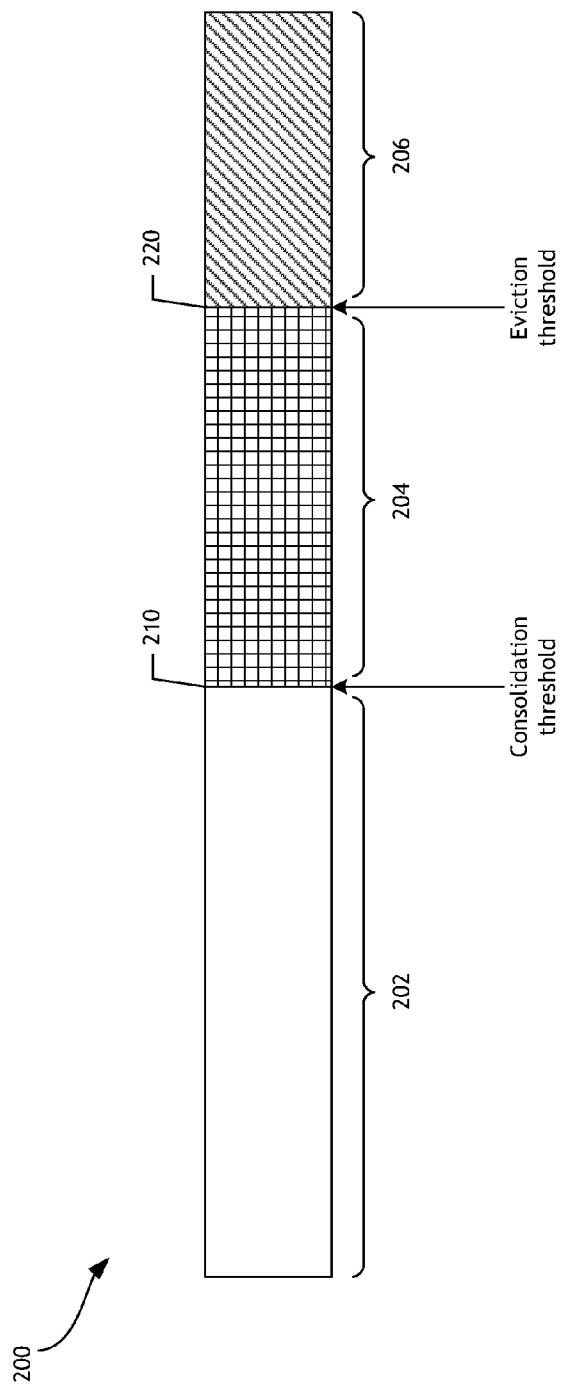
FIG. 2 illustrates a ranking based on priority information according to one embodiment of the invention.

FIG. 2 illustrates a ranking 200 of data units based on the data units' priority information according to one embodiment of the invention. The ranking 200 can be represented using a suitable data structure, such as list, queue, table, hash table, graph, etc. In one embodiment, the ranking 200 can be represented as a queue sorted according to priority information. For example, the ranking 200 can indicate positions of data units (e.g., logical addresses) stored in the non-volatile memory array 150 sorted according to priority information associated with stored data. In one embodiment, the data units may be sorted primarily according to a hinted priority level information received from the host, and then secondarily based on an observed data access metric such as a least recently access (LRU) criterion.

As is illustrated, data units corresponding to ranking range 202 have priority information that does not satisfy (e.g., is higher than) a consolidation threshold 210 and eviction threshold 220. For example, if the consolidation threshold is set at a priority score of 9 and the eviction threshold is set at 6, a data unit (e.g., logical block address (LBA)) with a priority score of 15 would be above both thresholds and in the ranking range 202. Such a data unit may be high priority data (e.g., frequently read data) that should be kept in the non-volatile memory array 150 which is serving as a cache of a hybrid drive in one or more embodiments. Thus, high priority data units (e.g., LBAs) in ranking range 202 can be moved or copied to a different memory region of the non-volatile memory array 150 during garbage collection. Such different memory region may be a free memory region designated for storing valid data to be preserved during garbage collection.

Embodiments of the invention modify conventional garbage collection with respect to data units in other ranking ranges. The first modification involves data units in ranking range 204 that have priority information that satisfies (e.g., is lower than) the consolidation threshold 210 but is higher than the eviction threshold 220. As discussed above, such data may be evicted from the non-volatile memory array 150 in the near future, as suggested by the priority information. Therefore, data units in ranking range 204 can be consolidated in yet another memory region of the non-volatile memory array 150 during garbage collection. Such memory region may be used to consolidate data units from various memory regions. To illustrate this, consider an example where a conventional garbage collection process may copy all valid data units from certain blocks 1-N to a free block X. In one embodiment, however, valid data units from blocks 1-N receive different treatment based on their priority ranking. For example, those valid data within ranking range 204 would not be copied to block X, but to a block Y reserved for consolidating such data, while valid data within ranking range 202 would continue to be copied to block X. Block Y, filled with such lower priority data that is likely to be invalidated soon, and would thus be an excellent candidate for a future garbage collection operation.

The second modification involves data units in ranking range 206 that have priority information that satisfies (e.g., is lower than) the consolidation threshold 210 and the eviction threshold 220. Data units in ranking range 206 can be evicted or marked for eviction from the non-volatile memory array 150 during garbage collection. Again, as the non-volatile memory array 150 is acting as a cache, certain data may have such low priority that they should be evicted. Thus, some embodiments of the invention integrate this eviction consideration into the garbage collection process, so that certain valid data that would normally be preserved under a conventional garbage collection scheme are not preserved in the garbage collection scheme of some embodiments. In other words, such valid data are treated as if they were invalid data. For example, data units in ranking range 206 can be marked for deletion and not moved or copied to any memory region in the non-volatile memory array 150. Continuing on the example above, valid data in ranking range 206 that is encountered during garbage collection would not be copied to any block at all (as opposed to being copied to block X under the conventional scheme).

In one embodiment, the eviction threshold 220 and/or consolidation threshold 210 can be selected based on various factors. For example, setting the eviction threshold high (e.g., so that more data is evicted) would allow new data to be stored in the non-volatile memory array 150. On the other hand, already stored data may be evicted. This may be advantageous when the data storage system 120 determines that at least a portion of data stored in the non-volatile memory array 150 has become outdated or stale. This determination may be based at least in part on the activity of the host system 110. In one embodiment, eviction threshold 220 and/or consolidation threshold 210 can be dynamically adjusted during the operation of the data storage system 120. Those skilled in the art would appreciate that the priority ranking illustrated in FIG. 2 is an example only and that in other embodiments could use a different scheme (such as reverse the meaning of "highest" to "lowest" with respect to the priority ranking determination). In other embodiments, other methods of tracking priority such as data flags, linked links, bit maps, and the like may be used. The above described garbage collection systems and processes do not relying upon a specific type of priority tracking mechanism.

Figure 3:
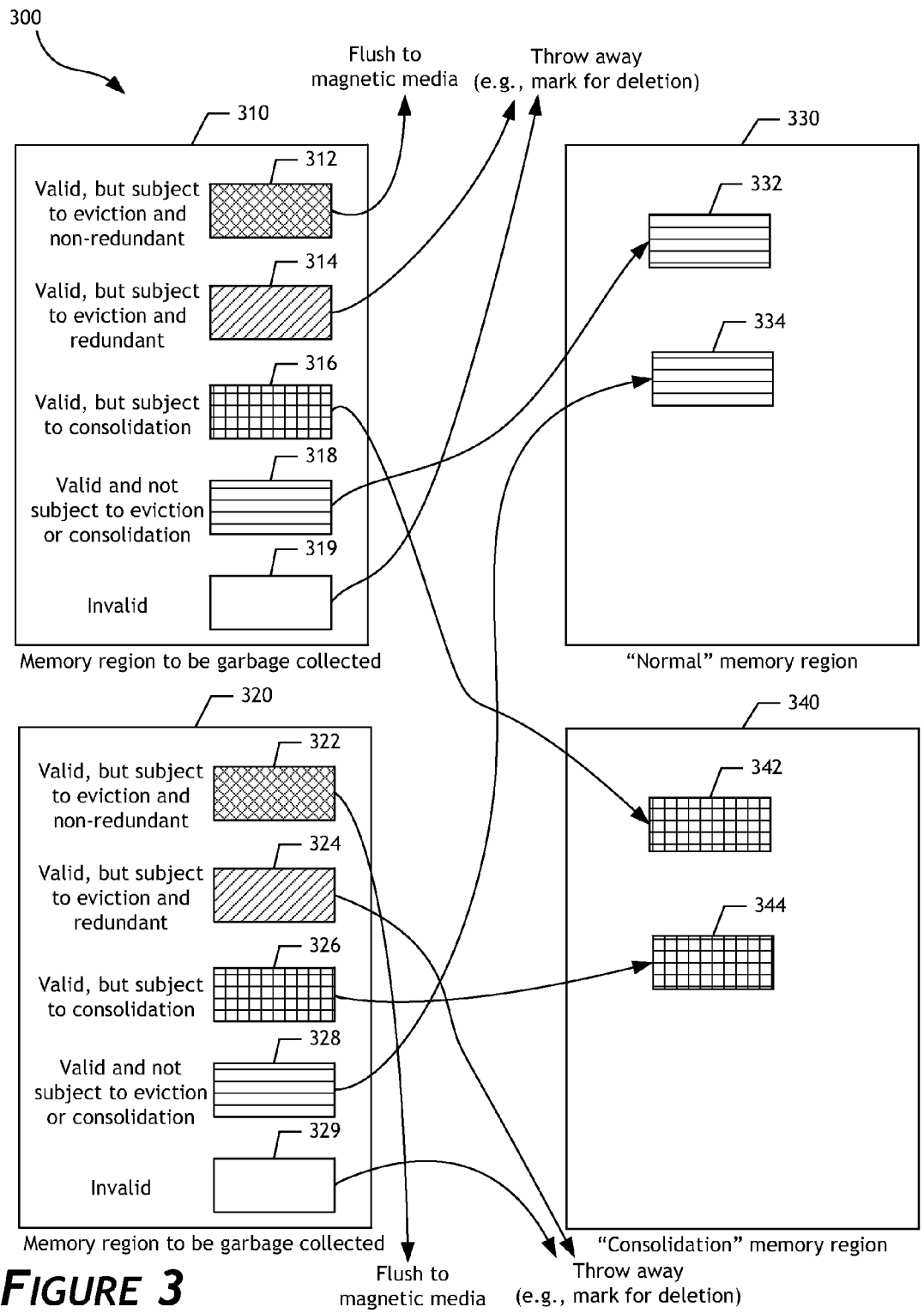
FIG. 3 illustrates operation of priority-based garbage collection according to one embodiment of the invention.

FIG. 3 illustrates operation of priority-based garbage collection 300 according to one embodiment of the invention. Priority-based garbage collection 300 can be executed by the controller 130 and/or the garbage collection module 132 and/or the data flush module 134. As is illustrated, memory regions 310 and 320 are being garbage collected. Priority-based garbage collection 300 determines priority information associated with data units of 312, 314, 316, 318, and 319 of region 310 and data units 322, 324, 326, 328, and 329 of region 320. In one embodiment, priority-based garbage collection 300 determines priority information using the ranking 200. For example, priority-based based garbage collection 300 can look up priority information associated with the data units.

In the example of FIG. 3, data units 312, 314, 316, and 318 has been determined by the priority-based garbage collection 300 as valid (e.g., not stale or invalidated by a more recent copy of data stored elsewhere). As noted above, valid data will receive different treatment depending on their associated priority information.

In the first case, priority-based garbage collection 300 determines that priority information associated with data unit 312 indicates that it is subject to eviction. For example, garbage collection 300 determines that the priority information satisfies the eviction threshold 220. In addition, priority-based garbage collection 300 determines that data unit 312 has not been synchronized with, for example, magnetic storage 160. For instance, data unit 312 can be the most recent copy of data stored by the host system 110. In other words, data stored in the memory unit 312 is non-redundant. Thus, data unit 312 is not evictable from the non-volatile memory array 150.

In one embodiment, data unit 312 can be copied to a different memory region. In the second case, priority-based garbage collection 300 determines that priority information associated with data unit 314 indicates that it is also subject to eviction. Unlike data unit 312, data unit 314 has been synchronized with, for example, magnetic storage 160. Thus, data unit 314 can be evicted from the non-volatile memory array 150, without being flushed to the magnetic storage 160. In one embodiment, the memory location within the memory region 310 storing data unit 314 can be marked for subsequent deletion or overwriting.

In the third case, priority-based garbage collection 300 determines that priority information associated with data unit 316 indicates that it is subject to consolidation (e.g., its priority information satisfies the consolidation threshold 210). Thus, data unit 316 can be consolidated in memory region 340, which is configured to store data designated for consolidation. In one embodiment, consolidating lower priority data in one or more memory regions can increase efficiency of garbage collection, as such data is likely to be evicted in the future. For example, write amplification associated with moving or copying data within the non-volatile memory array 150 can be reduced as a result of consolidating lower priority data in one or more memory regions. As is illustrated, data unit 316 is copied to the memory region 340. In one embodiment, the memory location within the memory region 310 storing data unit 316 can be marked for subsequent deletion or overwriting.

In the fourth case, priority-based garbage collection 300 determines that priority information associated with data unit 318 indicates that it is not subject to eviction or consolidation. For example, garbage collection 300 determines that the priority information does not satisfy the consolidation threshold 210 or the eviction threshold 220. Thus, data unit 318 can be moved or copied to another memory region 330, as with conventional garbage collection. For example, such data may be high priority data that should be retained in the non-volatile memory array 150. As is illustrated, data unit 318 is copied to the memory region 330. In one embodiment, the memory location within the memory region 310 storing data unit 318 can be marked for subsequent deletion or overwriting.

Finally, any invalid data encountered by the priority-based garbage collection 300 is handled the same way as with conventional garbage collection. Thus data unit 319, which is invalid (e.g., stale or invalidated by a more recent copy of data stored elsewhere), is not copied to another memory region, and the memory location within the memory region 310 storing data unit 319 can be marked for subsequent deletion or overwriting.

With respect to memory region 320, priority-based garbage collection 300 performs similar actions on the data units 322, 324, 326, 328, and 329 and treats each according to its associated priority information, as with the above described counterparts within the memory region 310. In one embodiment, data unit 326 can be copied to a memory region different from that where data unit 316 is copied. For example, memory region 340 may be full and a different consolidation region may be used.

In the same way, in one embodiment, data unit 328 can be copied to a memory region different from that where data unit 318 is copied. For example, memory region 330 may be full and a different memory region may be used.

Figure 4:
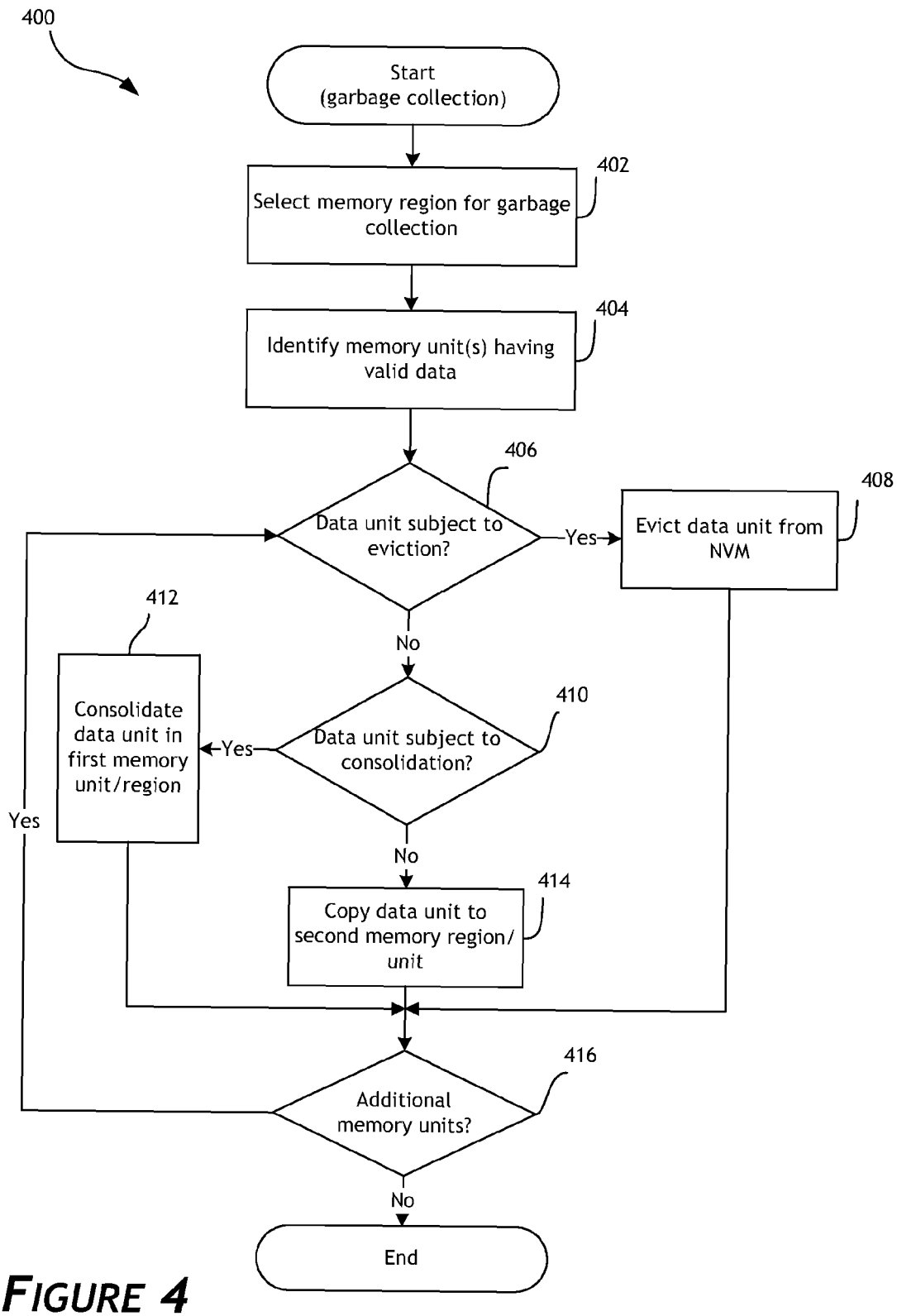
FIG. 4 illustrates a flow diagram of priority-based garbage collection according to another embodiment of the invention.

FIG. 4 is a flow diagram illustrating a process 400 of priority-based garbage collection according to one embodiment of the invention. The process 400 can be executed by the controller 130 and/or the garbage collection module 132 and/or the data flush module 134. The process 400 starts in block 402 where it selects a memory region for garbage collection. The process 400 transitions to block 404 where it identifies one or more memory units that store valid data. For each such memory unit, the process 400 performs the following operations.

In block 406, the process 400 determines whether data unit stored in a memory unit is subject to eviction. In one embodiment, the process 400 determines whether the priority information associated with the data unit satisfies the eviction threshold 220, and whether the data unit is redundant. If the process 400 determines that both of these conditions are satisfied, the data unit is evictable, and, the process transitions to block 408 where it evicts the data unit from the non-volatile memory 150. In one embodiment, the process 400 can mark the data unit for subsequent deletion or overwriting. The process 400 then transitions to block 416 where it determines whether there are additional memory units to process. If the process 400 determines that there are one or more additional memory units to process, the process 400 transitions to 406 where it processes the next data unit. Otherwise, the process 400 terminates.

If in block 406 the process 400 determines that the data unit is not subject to eviction, the process transitions to block 410 where it determines whether the data unit is subject to consolidation. In one embodiment, the process 400 determines whether the priority information associated with the data unit satisfies the consolidation threshold 210. If the process 400 determines that the data unit is subject to consolidation, the process transitions to block 412 where it copies the data unit to a memory unit in a first memory region, which is configured as a consolidation memory region. The process 400 then transitions to block 416 where it determines whether there are additional memory units to process. If the process 400 determines that there are one or more additional memory units to process, the process 400 transitions to 406 where it processes the next data unit. Otherwise, the process 400 terminates.

If in block 410 the process 400 determines that the data unit is not subject to consolidation, the process transitions to block 414. For example, the data unit is high priority data, such as data unit from the ranking range 202 of FIG. 2, or non-redundant, low priority data. In block 414, the process 400 moves or copies the data unit to a memory unit to a second memory region, which is configured as a standard memory region. The process 400 then transitions to block 416 where it determines whether there are additional memory units to process. If the process 400 determines that there are one or more additional memory units to process, the process 400 transitions to 406 where it processes the next data unit. Otherwise, the process 400 terminates.

Figure 5:
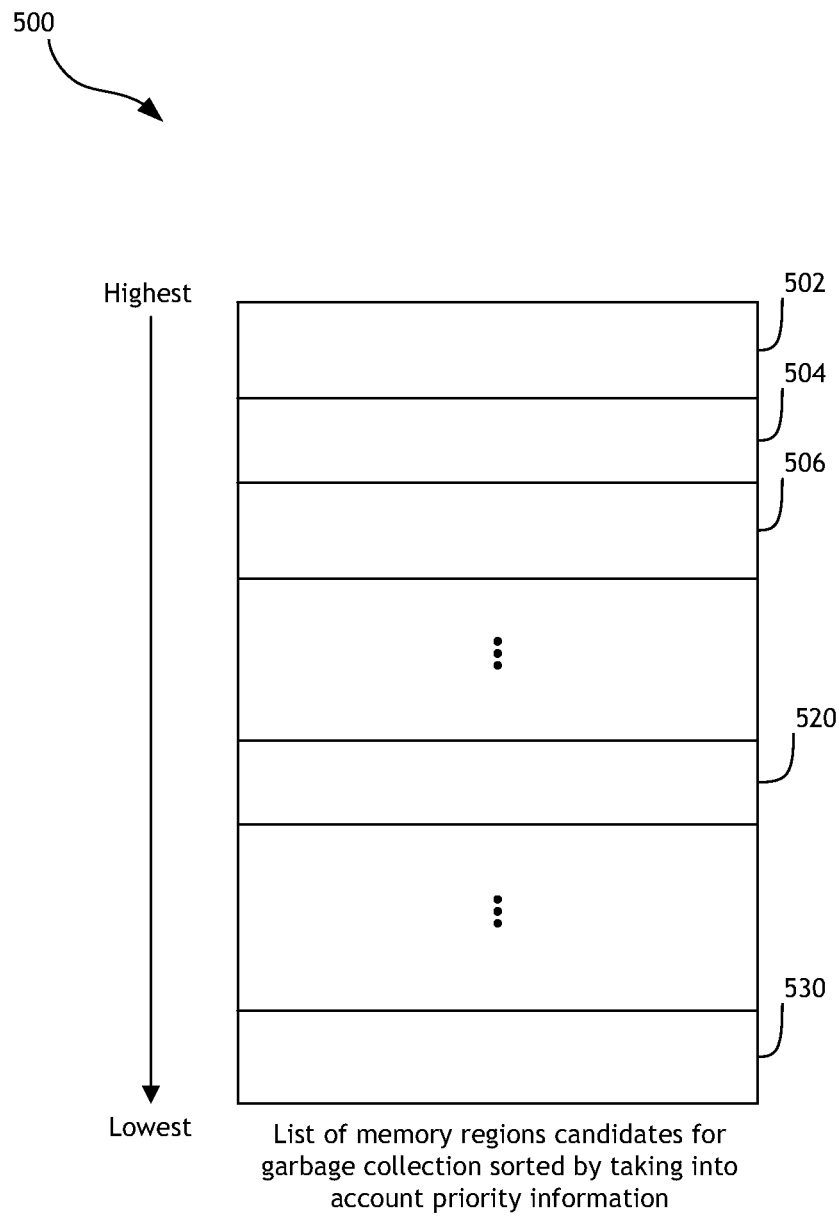
FIG. 5 illustrates selecting one or more regions for garbage collection according to one embodiment of the invention.

FIG. 5 illustrates selecting one or more regions for garbage collection according to one embodiment of the invention. Selecting the one or more regions for garbage collection can be executed by the controller 130 and/or the garbage collection module 132. In one embodiment, the selection can be performed in block 402 of FIG. 4. Garbage collection candidate list 500 includes memory regions, such as blocks, 502, 504, 506, 520, 530, etc. Traditionally, garbage collection candidate list can be sorted according to a number of invalid data units in a memory region. In one embodiment, garbage collection candidates list 500 is also sorted according to the priority information associated with the data units. For example, a combined metric that takes into account number of invalid data units in the region and priority information of the data units stored in the region can be computed. In one embodiment, the combined metric is a sum of the number of invalid data units and the number of evictable data units (e.g., redundant data units whose priority information satisfies the eviction threshold 220). In another embodiment, the combined metric is a weighted average of the number of invalid data units and the priority information associated with the data units stored in the region. The entries in the list 500 can be sorted according to the descending order of priority. That is, regions with higher combined metric can be placed at the top of the list 500. Higher combined metric can indicate that the region is a more likely candidate for garbage collection. For example, region 502 can be the most likely candidate for garbage collection. In another embodiment, the entries in the list can be sorted according to the ascending order of priority. In another embodiment, higher combined metric can indicate that the region is a less likely candidate for garbage collection. In yet another embodiment, any suitable data structure can be used along with or in place of the list 500, such as queue, table, hash table, graph, etc.

In one embodiment, during garbage collection, data units that store invalid data and data units that have valid, redundant (e.g., synchronized) data whose priority information satisfies the eviction threshold 220 can be garbage collected efficiently because such data units are not copied or moved to any other memory region. Data units that have valid data whose priority information satisfies the eviction threshold 220 but whose data is non-redundant are not evictable and may need to be copied or moved to another memory region during garbage collection. For instance, the magnetic disk may not be spinning during garbage collection, and therefore non-redundant data cannot be synchronized. As another example, even if the magnetic disk is spinning, it may not be desirable to copy non-redundant data to the disk due to the delays associated with copying. Accordingly, it may be advantageous to flush to the magnetic storage 160 valid, non-redundant, low priority data units so that the efficiency of garbage collection are enhanced. Such flushing can be performed by the data flush module 134.

In one embodiment, flushing of non-redundant, low priority data units takes into account priority information associated with the data units. Flushing non-redundant data units can increase the combined metric of a region where data units are stored provided that priority information of flushed data units satisfies the eviction threshold 220. The data flush module 134 can select for flushing one or more non-redundant data units whose priority information satisfies the eviction threshold 220, thereby making such one or more regions more attractive candidates for garbage collection. Once such non-redundant data units have been flushed, they can be evicted during garbage collection. Accordingly, the efficiency of garbage collection is improved. Using this approach, flushing of low priority data is reordered or prioritized so that the efficiency of garbage collection is enhanced.

In one embodiment, data units can be selected for synchronization with the magnetic storage 160 by giving preference to those data units that satisfy the eviction threshold 220 and are stored in one or more memory regions that are candidates for garbage collection. At least some data units so selected are synchronized or flushed. These flushed data units can be evicted during garbage collection. For example, flushed data units can be designated not to be copied to any memory region during garbage collection.

For example, suppose that region 506 stores 50% invalid data units, 10% valid, redundant data units whose priority information satisfies the eviction threshold 220, and 15% valid, non-redundant data units whose priority information satisfies the eviction threshold 220. Before the non-redundant low priority data units are flushed, the combined metric of the region 506 is 60. However, if all non-redundant low priority data units are flushed or synchronized, the combined metric of the region would increase to 75. Accordingly, region 506 would become a more attractive candidate for garbage collection as only 25% of data units stored in the region may need to be copied or moved to another memory region during garbage collection.

Conclusion

The disclosed priority-based garbage collection utilizes attributes of data stored in the non-volatile memory array in order to improve efficiency of garbage collection and of the overall data storage system. A set of low priority data can be selectively evicted from the non-volatile memory array. This can, for example, reduce write amplification associated with garbage collection. Another set of low priority data can be regrouped or consolidated in a different region of the non-volatile memory array. In addition, flushing of data can be performed in order to enhance or optimize garbage collection. Performance and endurance can thereby be improved.

Other Variations

Those skilled in the art will appreciate that in some embodiments, disclosed techniques can applied to other housekeeping operations performed by a storage system. For example, priority of data can be taken into account during wear leveling, bad block management, and so on. In addition, additional factors can be used to determine priority of stored data. Moreover, priority of stored data can be determined using any suitable combination of factors and applying any suitable function to the combination, such as averaging, weighted averaging, least squares determination, and other linear and/or nonlinear functions. The actual steps taken in the disclosed processes, such as the processes illustrated in FIGS. 3 and 4, may differ from those shown in the figures. Additional system components can be utilized, and disclosed system components can be combined or omitted. Depending on the embodiment, certain of the steps described above may be removed, others may be added. Accordingly, the scope of the present disclosure is intended to be defined only by reference to the appended claims.

While certain embodiments have been described, these embodiments have been presented by way of example only, and are not intended to limit the scope of the protection. Indeed, the novel methods and systems described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection. For example, the systems and methods disclosed herein can be applied to hard disk drives, solid state drives, and the like. In addition, other forms of storage (e.g., DRAM or SRAM, battery backed-up volatile DRAM or SRAM devices, EPROM, EEPROM memory, etc.) may additionally or alternatively be used. As another example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A data storage system, comprising:
a non-volatile memory array having a plurality of memory regions configured to store a plurality of data units, the plurality of memory regions comprising a first memory region, a second memory region, and a third memory region, each of the first, second, and third memory regions being defined as a memory unit configured to be garbage collected; and
a controller configured to perform a garbage collection operation on the first memory region by at least:
identifying valid data units in the first memory region that contain valid data rather than invalid data;
in response to determining that a first set of the valid data units has a first priority, designating the first set as data units to be copied to the second memory region, the first priority indicating that the valid data units of the first set are candidates for being erased from the non-volatile memory array during a subsequent garbage collection operation;
in response to determining that a second set of the valid data units has a second priority different from the first priority, designating the second set as data units to be copied to the third memory region; and
copying the first set of the valid data units from the first memory region to the second memory region and the second set of the valid data units from the first memory region to the third memory region different from the second memory region,
wherein the controller is further configured to perform the garbage collection operation on the first memory region by:
in response to determining that a third set of the valid data units has a third priority different from the first priority and the second priority, designating the third set as data units not to be copied to any memory region in the non-volatile memory array so that the third set of data units are erased when the first memory region is erased.

2. The data storage system of claim 1, wherein subsequent to performing the garbage collection operation on the first memory region, the controller is further configured to perform a garbage collection operation on the second memory region by designating at least some valid data units in the second memory region as data units not to be copied to any memory region in the non-volatile memory array so that the at least some valid data units in the second memory region are erased when the second memory region is erased.

3. The data storage system of claim 1, wherein the controller is further configured to determine that the first set has the first priority based on a comparison of priority information associated with the first set to a threshold.

4. The data storage system of claim 1, wherein the controller is further configured to:
determine garbage collection rankings of the plurality of memory regions based at least in part on priority information of the plurality of data units in the plurality of memory regions; and
select one or more memory regions of the plurality of memory regions for garbage collection operations including the garbage collection operation on the first memory region based on the garbage collection rankings.

5. The data storage system of claim 1, wherein the invalid data comprises a copy of data corresponding to one or more logical addresses, the copy having been written earlier than a more recent copy of the data corresponding to the one or more logical addresses.

6. The data storage system of claim 4, further comprising a magnetic storage configured to store data, wherein the controller is further configured to:
in selecting data for synchronization with the magnetic storage, give preference to data that (1) satisfy an eviction threshold based on the priority information associated with the data, and (2) reside in the one or more memory regions that are candidates for the garbage collection operations;
synchronize at least some of the selected data; and
designate the synchronized data as data not to be copied to any memory region in the non-volatile memory array during at least one garbage collection operation of the garbage collection operations.

7. The data storage system of claim 1, wherein the controller is further configured to determine the first priority based on one or more of: priority information provided by a host system, frequency of access of the first set, duration since last access of the first set, and read to write ratio of the first set.

8. In a data storage system comprising a non-volatile memory array having a plurality of memory regions configured to store a plurality of data units, the plurality of memory regions comprising a first memory region, a second memory region, and a third memory region, each of the first, second and third memory regions being defined as a memory unit configured to be garbage collected, a method comprising:
performing a garbage collection operation on the first memory region by at least:
identifying valid data units in the first memory region that contain valid rather than invalid data;
in response to determining that a first set of the valid data units has a first priority, designating the first set as data units to be copied to the second memory region, the first priority indicating that the valid data units of the first set are candidates for being erased from the non-volatile memory array during a subsequent garbage collection operation;
in response to determining that a second set of the valid data units has a second priority different from the first priority, designating the second set as data units to be copied to the third memory region; and
copying the first set of the valid data units from the first memory region to the second memory region and the second set of the valid data units from the first memory region to the third memory region different from the second memory region; and
performing the garbage collection operation on the first memory region by, in response to determining that a third set of the valid data units has a third priority different from the first priority and the second priority, designating the third set as data units not to be copied to any memory region in the non-volatile memory array so that the third set of data units are erased when the first memory region is erased.

9. The method of claim 8, further comprising subsequent to performing the garbage collection operation on the first memory region, performing a garbage collection operation on the second memory region by at least designating at least some valid data units in the second memory region as data units not to be copied to any memory region in the non-volatile memory array so that the at least some valid data units in the second memory region are erased when the second memory region is erased.

10. The method of claim 8, further comprising determining that the first set has the first priority based on a comparison of priority information associated with the first set to a threshold.

11. The method of claim 8, further comprising:
determining garbage collection rankings of the plurality of memory regions based at least in part on priority information of the plurality of data units in the plurality of memory regions; and
selecting one or more memory regions of the plurality of memory regions for garbage collection operations including the garbage collection operation on the first memory region based on the garbage collection rankings.

12. The method of claim 8, wherein the invalid data comprises a copy of data corresponding to one or more logical addresses, the copy having been written earlier than a more recent copy of the data corresponding to the one or more logical addresses.

13. The method of claim 11, wherein the data storage system further comprises another data storage configured to store data, and further comprising:
in selecting data for synchronization with the another data storage, giving preference to data that (1) satisfy an eviction threshold based on the priority information associated with the data, and (2) reside in the one or more memory regions that are candidates for the garbage collection operations;
synchronizing at least some selected data; and
designating the synchronized data as data not to be copied to any memory region in the non-volatile memory array during at least one garbage collection operation of the garbage collection operations.

14. The method of claim 8, further comprising determining the first priority based on one or more of: priority information provided by a host system, frequency of access of the first set, duration since last access of the first set, and read to write ratio of the first set.

15. The method of claim 8, wherein the data storage system further comprises magnetic media, and further comprising:
designating the third set as data units to be evicted to magnetic media; and
using the non-volatile memory array as cache memory for the magnetic media.

16. The method of claim 8, further comprising:
designating the third set as data units to be evicted to a remote data storage; and
using the non-volatile memory array as cache memory for the remote data storage.

17. The data storage system of claim 1, wherein the controller is further configured to perform the garbage collection operation on the first memory region by designating the third set as data units to be evicted to magnetic media, and wherein the non-volatile memory array is configured as cache memory for the magnetic media.

18. The data storage system of claim 1, wherein the controller is further configured to perform the garbage collection operation on the first memory region by designating the third set as data units to be evicted to a remote data storage, and wherein the non-volatile memory array is configured as cache memory for the remote data storage.

19. The data storage system of claim 1, wherein the plurality of memory regions comprise a fourth memory region different from any of the first, second, and third memory regions, wherein the fourth memory region is defined as a memory unit configured to be garbage collected, wherein the fourth memory region comprises a fourth set of valid data units having the first priority and a fifth set of valid data units having the second priority, and wherein the controller is further configured to copy the fourth set of the valid data units from the fourth memory region to the second memory region and the fifth set of the valid data units from the fourth memory region to the third memory region.

20. The data storage system of claim 1, wherein the controller is further configured to determine the second priority based on one or more of: priority information provided by a host system, frequency of access of the second set, duration since last access of the second set, and read to write ratio of the second set.

21. The data storage system of claim 1, wherein the controller is further configured to determine the third priority based on one or more of: priority information provided by a host system, frequency of access of the third set, duration since last access of the third set, and read to write ratio of the third set.

22. The method of claim 8, further comprising determining the second priority based on one or more of: priority information provided by a host system, frequency of access of the second set, duration since last access of the second set, and read to write ratio of the second set.

23. The method of claim 8, further comprising determining the third priority based on one or more of: priority information provided by a host system, frequency of access of the third set, duration since last access of the third set, and read to write ratio of the third set.

\* \* \* \* \*